(12) United States Patent
Xu

(10) Patent No.: US 8,732,653 B1
(45) Date of Patent: May 20, 2014

(54) SYSTEM AND METHOD OF PROVIDING RESOURCE MODIFICATION IN A VIRTUAL COMMUNITY

(75) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 960 days.

(21) Appl. No.: 11/516,454

(22) Filed: Sep. 5, 2006

Related U.S. Application Data

(60) Provisional application No. 60/596,165, filed on Sep. 5, 2005.

(51) Int. Cl.
*G06F 9/44* (2006.01)
(52) U.S. Cl.
USPC ............ 717/101; 717/102; 717/103; 717/109
(58) Field of Classification Search
None
See application file for complete search history.

(56) References Cited

U.S. PATENT DOCUMENTS

| | | | | |
|---|---|---|---|---|
| 6,144,991 A | * | 11/2000 | England | 709/205 |
| 6,560,639 B1 | * | 5/2003 | Dan et al. | 709/218 |
| 6,691,155 B2 | * | 2/2004 | Gottfried | 709/204 |
| 6,763,388 B1 | * | 7/2004 | Tsimelzon | 709/228 |
| 6,983,416 B1 | * | 1/2006 | Bae et al. | 715/234 |
| 7,058,897 B2 | * | 6/2006 | Matsuda | 715/758 |
| 7,139,796 B2 | * | 11/2006 | Rekimoto et al. | 709/204 |
| 7,437,660 B1 | * | 10/2008 | Mehta et al. | 715/205 |
| 7,568,004 B2 | * | 7/2009 | Gottfried | 709/204 |
| 7,685,234 B2 | * | 3/2010 | Gottfried | 709/204 |
| 7,941,748 B1 | * | 5/2011 | Sundermeyer et al. | 715/255 |
| 2001/0029832 A1 | * | 10/2001 | Kanda et al. | 84/609 |
| 2002/0052918 A1 | * | 5/2002 | Rekimoto et al. | 709/204 |
| 2002/0054094 A1 | * | 5/2002 | Matsuda | 345/753 |
| 2003/0204810 A1 | * | 10/2003 | Dam et al. | 715/500 |
| 2003/0229849 A1 | * | 12/2003 | Wendt | 715/513 |
| 2003/0236834 A1 | * | 12/2003 | Gottfried | 709/204 |
| 2004/0098451 A1 | * | 5/2004 | Mayo | 709/203 |
| 2004/0205488 A1 | * | 10/2004 | Fry | 715/501.1 |
| 2004/0225715 A1 | * | 11/2004 | Gottfried | 709/204 |
| 2005/0080876 A1 | * | 4/2005 | Peiffer et al. | 709/217 |
| 2005/0235038 A1 | * | 10/2005 | Donatella et al. | 709/206 |
| 2005/0246283 A1 | * | 11/2005 | Gwiazda et al. | 705/52 |
| 2006/0031404 A1 | * | 2/2006 | Kassab | 709/218 |

\* cited by examiner

*Primary Examiner* — Isaac Tecklu

(57) ABSTRACT

A system and method of modifying a resource in a resource based virtual community is disclosed. The method of modifying a resource includes the steps of (a) accessing the resource, (b) selecting a sub element of the resource for modification, (c) making modifications to the sub element, and (d) submitting the modifications to a virtual community server. Alternatively, a method of displaying a modified sub element of a resource in a resource based virtual community includes the steps of (a) accessing a virtual community server, (b) receiving the modified sub element of the resource in the virtual community server, (c) applying the modified sub element to the resource, (d) and displaying the modified resource.

20 Claims, 6 Drawing Sheets

SYSTEM AND METHOD OF PROVIDING RESOURCE MODIFICATION IN A VIRTUAL COMMUNITY

CROSS REFERENCE TO RELATED APPLICATIONS

The present application claims priority under 35 U.S.C. 119(e) from provisional patent application Ser. No. 60/596,165, entitled "Real-time collaboration based on sub-elements of resources", filed on Sep. 5, 2005, the disclosure of which is herein incorporated by reference in its entirety.

BACKGROUND OF THE INVENTION

1. Field of the Invention

The present invention relates to virtual online communities and more particularly to a system and method of providing resource modification in a virtual online community.

2. Description of Related Art

With the rapid development of the Internet and web technology, web browsing has become a part of modern life. Many people browse the Internet at work, from home, or both. More and more people are spending more and more time browsing the web. According to some statistics, the Internet and the World Wide Web have become an important source of information for those browsing the Internet.

However, most web browsing activities are done individually, with no interaction with other users. For example, when a person is visiting a web page, the person has no idea that another person may also be browsing the same web page at the same time. Some web pages do support online forums to allow online users to participate in online communities and to communicate with each other. However the communication is limited because both users have to access and logon to a same web server first.

Other approaches supporting online discussions, such as Microsoft discussion servers, allow a group of users to collaborate online. One solution includes a web server that allows users to discuss web pages stored in the web server. Another solution allows users to share files on the same web page, send messages to each other or conduct job related or similar activities by means of collaboration servers. Most of these collaborations are used in office environments or require some modification in the server side.

United States Patent Application Publication No. 20030101227 to Fink, entitled "Message collaborator", discloses a message collaborator system and method that establishes a relationship with more than one sender and a recipient. Directives are contained in the profile defining each of the relationships and how information is to be filtered or established into or out of a message. Rules are provided for collaborating all of these profiles in order to pull content from multiple sources remotely or from local databases containing content from the more than one sender, collecting the content into a single, comprehensive message and then delivering the single, comprehensive message to the recipient. The disclosed system relates to collaboration and to rules used in a local system and does not relate to resource based virtual communities or to the collaborative modification of resources.

United States Patent Application Publication No. 20030158897 to Ben-Natan et al., entitled "Networked platform for creating and supporting communities", discloses a system for defining communities and matching users into the communities. The matched users gain access to one or more elements associated with the communities. The system comprises a host connected to a network for communication with a plurality of users, the host being configured for creating at least one community by defining attributes for each of the communities. The host defines one or more elements associated with each of the communities and assigns attributes to a user, the attributes extracted from information associated with the user. The host also matches the attributes of at least one user to attributes of at least one community and assigns the user to the community based on the result of the matching, the user thereby gaining access to at least one element associated with the community. The disclosed communities are not dynamic.

U.S. Pat. No. 6,915,336 to Hankejh entitled, "Real time internet communication system", discloses a real time internet communication system. The system allows users to collaborate on the fly, and without having to own or download any programs that then stay resident on the user's computer. The system is marketed using a business system that makes highly productive software available to businesses and end users, but which is not purchased by customers or end users, has no conventional distribution system, and never requires update, installation or rollout by the customer or end user. Although the disclosed system provides a system for enabling simultaneous web browsing and real-time chat functions, it is limited to allowing users engaged in web chatting to view a same web page U.S. Pat. No. 6,912,573 to Ohkado et al. entitled "Method for acquiring content information, and software product, collaboration system and collaboration server for acquiring content information", discloses a method in which a customer browser and an agent browser are connected to each other through a collaboration server, and a Web server is controlled so as to be accessed through the collaboration server. When the browsers refer to a page, the collaboration server embeds an applet for detecting a change in the page and a client controller for displaying a page corresponding to changed page information of the other party which performs collaboration. When the customer and agent browsers detect the change in the page, the applet is invoked, and the changed page information is sent to the other party via the collaboration server, and the client controller on the other party controls the browser so as to display the changed page. The disclosed method uses the collaboration server and the applet to detect page changes but does not disclose ways for users to comment on web pages and modify the contents thereof.

U.S. Pat. No. 6,507,865 to Hanson et al. entitled "Method and system for group content collaboration", discloses a method and system that can be used to support content collaboration among a group of participants connected to a network. A participant creates an electronic form specifying the content and a list of network addresses corresponding to other participants in the content collaboration. A server receives the form and includes resources for delivering an electronic mail message associated with an electronic medium associated with the content collaboration. When the participant opens the message, the electronic medium is produced by the server that includes static and dynamic regions. The participant can modify or change the content. The dynamic regions are asynchronously updated in the server and indicate the current content of the electronic medium that can be accessed by other participants. The content may be binary or textual.

U.S. Pat. No. 6,505,233 to Hanson et al. entitled "Method for communicating information among a group of participants", discloses a method that can be used to communicate information among a group of participants. A participant may create an electronic form specifying a list of network addresses corresponding to other participants intended to receive the communication. A server receives the form and delivers a message associated with an electronic medium. When the participant opens the message, the electronic medium is produced by the server and includes static and dynamic content. The participant can add content to the dynamic content. The dynamic content may be asynchronously dynamically updated in the server to indicate a then current content of the electronic medium, and can be accessed by other to participants in the group. The patents to Hanson et al. relate to ways of starting collaborations among participants and do not relate to resource based virtual communities or to the collaborative modification of resources.

A resource based virtual community is described in co-owned and co-pending U.S. patent application Ser. No. 10/710,964, filed on Aug. 15, 2004 entitled "Resource Based Virtual Communities", the disclosure of which is herein incorporated by reference in its entirety. The described resource based virtual community allows any person from anywhere in the world to meet with other users who are browsing a same web page at the same time by dynamically participating in the resource based virtual communities in real time. Users can automatically join the virtual communities while surfing the web and become members of the virtual communities. A member can conduct collaborative work with other members who are visiting the same web resource.

While the resource based virtual community provides the described advantages, there remains a need in the art for a system and method of providing resource modification in a virtual community that allows for collaboration on sub-elements of a community resource. Such resource sub-elements may include titles, paragraphs, sentences, pictures, words, and combinations of these elements. There is also a need for a system and method that provides a means whereby members of the virtual community can modify the community resources. There is a further need for a system and method that provides virtual community members with statistical information such as the number of current members using a particular resource or other relevant information enabling community members to decide whether to access the particular resource.

SUMMARY OF THE INVENTION

In resource-based virtual communities, when a virtual community member accesses a resource such as a web page, the member has the ability to post comments, exchange ideas, chat with other members accessing the same resource, and engage in other collaborative activities. Most such activities are based on the resource itself. In accordance with the present invention, members are enabled to conduct collaborative activities on sub elements of the resource in addition to the resource itself. Such collaborative activities include modifying sub-elements of the resource.

In accordance with one aspect of the invention, a method of modifying a resource in a resource based virtual community includes the steps of (a) accessing the resource, (b) selecting a sub element of the resource for modification, (c) making modifications to the sub element, and (d) submitting the modifications to a virtual community server.

In accordance with another aspect of the invention, a system for modifying a resource in a resource based virtual community includes a virtual community server; and a plug-in application coupled to the virtual community server, wherein the plug-in application enables a user to select a sub element of an accessed resource for modification, to make modifications to the selected sub element, and to submit the modifications to the virtual community server.

In accordance with another aspect of the invention, a method of displaying a modified sub element of a resource in a resource based virtual community includes the steps of accessing a virtual community server, receiving the modified sub element of the resource in the virtual community server, applying the modified sub element to the resource, and displaying the modified resource.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of functional components and to the arrangements of these components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF A PREFERRED EMBODIMENT OF THE INVENTION

Figure 4:
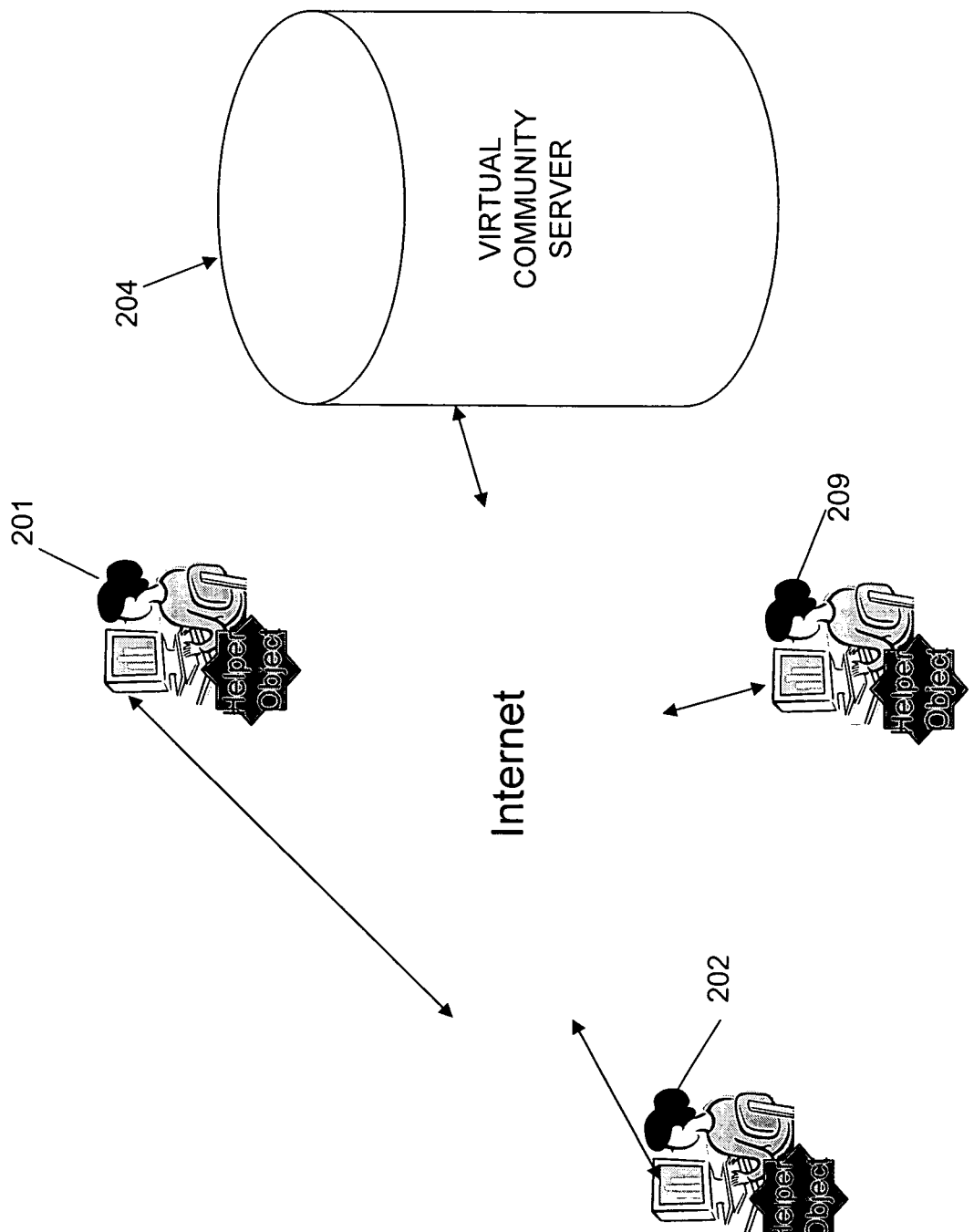
FIG. 4 is a schematic representation of a system of providing resource modification in a virtual community in accordance with the invention.

A system in accordance with the invention is shown in FIG. 4. A virtual community server 204 is coupled through the Internet to a plurality of clients 201, 202 and 209. The virtual community server 204 will be further described below.

Figure 1:
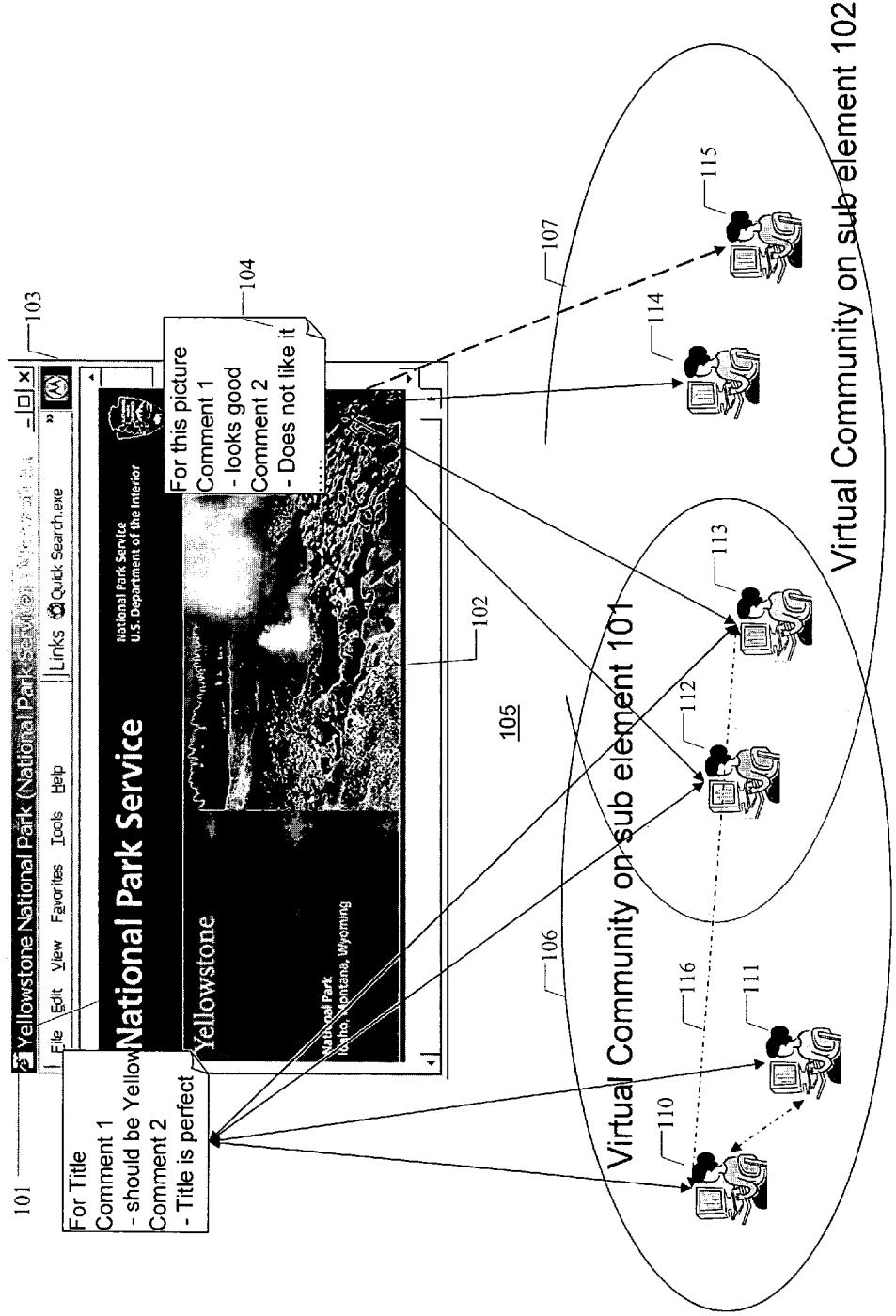
FIG. 1 is a screen shot illustrating resource sub element virtual communities in accordance with the invention.
Figure 2:
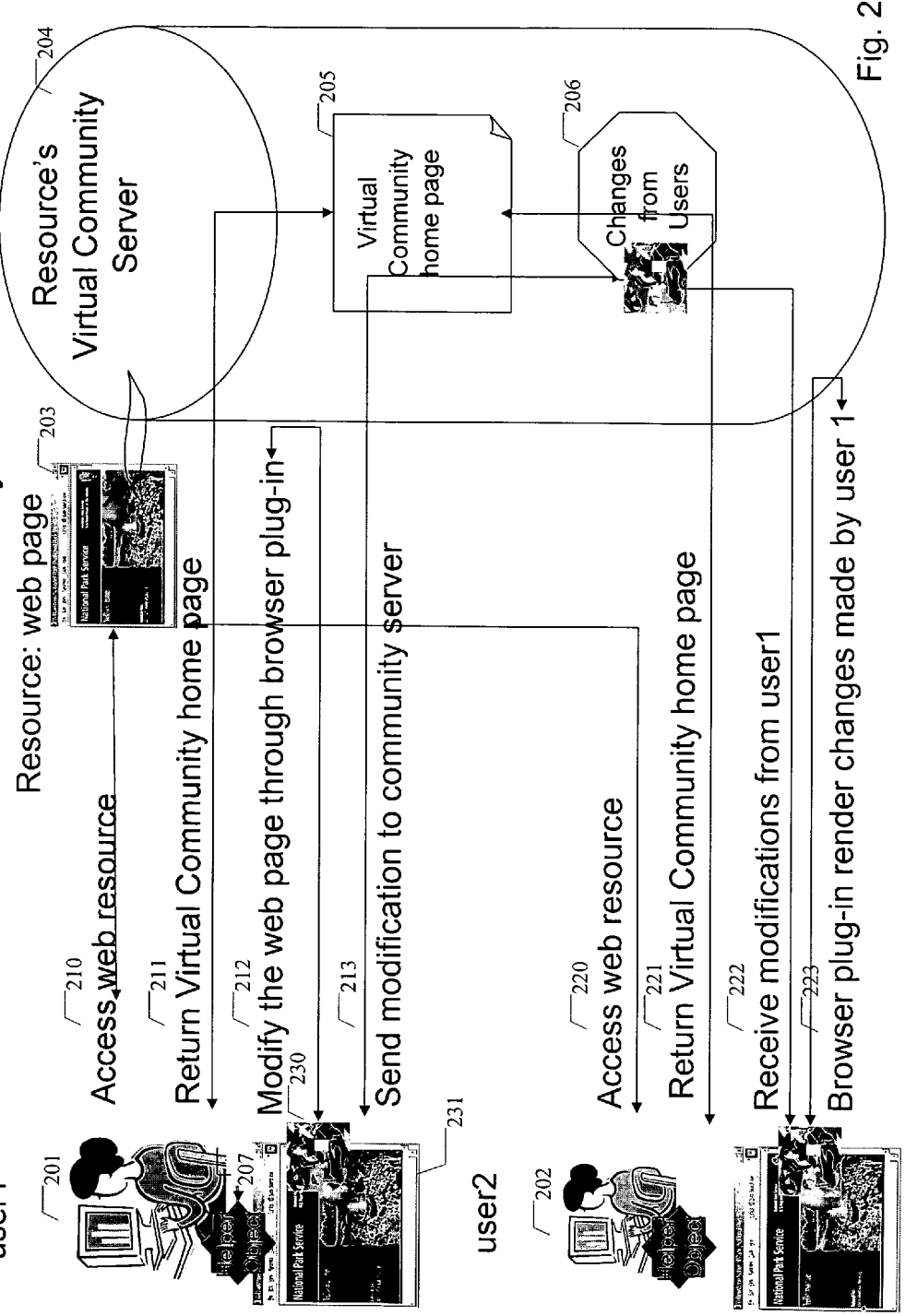
FIG. 2 is a graphical illustration showing a method of modifying a resource and results thereof in accordance with the invention.

In the following discussion, a resource 103 (FIG. 1) includes a web resource such as web site, a web page, and an ftp or gopher page. It can also include any other online or offline resources that can be accessed by users. A resource 103 also includes resources that contain sub components such as a software product or other product having many components. Community content 104 generally includes content acted upon by virtual community members 110, 111, 112, 113, 114, 115 and 116 associated with a resource 103 and maintained by a virtual community server 204 (FIG. 2). Examples include comments, discussions, rankings and modifications of resource sub elements.

When a virtual community member 201, 202 accesses a web resource 203, a virtual community system will send the URL of the web resource 203 that the member 201,202 is accessing to a virtual community server 204. The virtual community server 204, which may be centralized, distributed, or peer-to-peer based, together with a plug-in application or object helper 207 installed on members' client machines, comprise the components of the virtual community system. The virtual community server 204 will return a community content (web page) 230 corresponding to the web resource that the member 201,202 is currently accessing. The returned web page can be presented to the member as a popup window or an accompanying window next to the member's main browsing window 231. From the returned web page, the member 201,202 can access other community content including related activities or services provided by the virtual community server 204. The related activities or services may include reading comments from other members, posting comments related to the web resource, voting for the web resource or chatting with other online members accessing the same web resource.

The main browsing (content) window 231 and the community content window 230 may include separate windows that do not interfere with each other. When the member 201,202 goes to another web resource by selecting from a favorite's list, manually entering the new URL into the address bar, or clicking a link in the main browsing window 231, the virtual community server 204 is notified of the action by the browser plug-in application or helper object 207 installed on the member's client machine. The browser plug-in application or helper object 207 is operable to intercept the event of switching web resources. The virtual community server 204 then serves the member a new community content corresponding to the new web resource in the community window 230.

In accordance with the invention, the system and method of providing resource modification enable members to collaborate on sub-elements of resources including modifying the contents of the resources in real-time. The system and method further allow both the web resource window and the community resource window to communicate with each other and allow these communications and modifications to propagate through the community, be saved, and be shared with all other members of the community, that is, with whomever is accessing that same resource.

A browser plug-in application or helper object 207 in accordance with the invention can intercept the member's actions in the main browsing window 231 and capture specific triggering events such as a right mouse click, double clicks, special key stokes or combinations of these events that are performed on the web resource. These events are pre-defined by the system and may be changeable by each member 201,202.

Once a predefined triggering event is intercepted, the member 201,202 is allowed to select from a range of the sub elements of the resource 103 (FIG. 1) to collaborate on, for example, the page title 101, paragraphs, sentences, image 102, words, or a combination of these elements selected by the member. A virtual community 106 is formed based upon the page title sub element 101 and a virtual community 107 is formed based upon the image sub element 102. If the resource is an html web page, the member can select these elements by selecting one or more html tags. If the resource is an XML file, the member can select based on XML tags. If the resource is a picture or image, the user can select a portion of the image. The selected elements or selections are called sub elements of the resource.

During the selection of the sub elements, the system will also keep track of the sub elements' positions as well as their range of coverage. In this manner, the same sub elements can be selected, marked, referenced and redisplayed in the future. The actual positioning mechanism can vary according to different types of sub elements and content format. For example, if the resource is a plain text file, the remembered position can be marked as the number of words from the beginning of the whole text or number of paragraphs and words within the offset. For XML files, it can be an XPath. For HTML files, it can be the html tag ID or position inside the DOM tree. For image files, it can be the pixel's position of the top left corner and the dimensions of the selected rectangles.

Once the sub elements are selected and their positions remembered, the system will let the members know that they are now able to collaborate on the sub elements. The system may prompt the member with the actions they can perform and share with others. The actions can be pre-defined in the system or in the browser plug-in application or browser helper object 207 and can be enhanced or improved as required. The actions may be in the form of pop-up windows, pop-up menus, and small dialog boxes with several options that members can choose from.

For example, one of the collaborative actions members can perform is to make changes or add comments for the selected sub elements. Another collaborative action includes the modification of the sub elements in place, and a third collaborative action includes voting for the sub elements. There are many other collaborative actions that members may interactively collaborate on relative to the selected sub elements, as long as the actions involve the members that are using the resource and the sub elements of the resource. For each action, there are multiple implementations that allow members to continue performing the actions. A few such implementations are described as follows.

Figure 5:
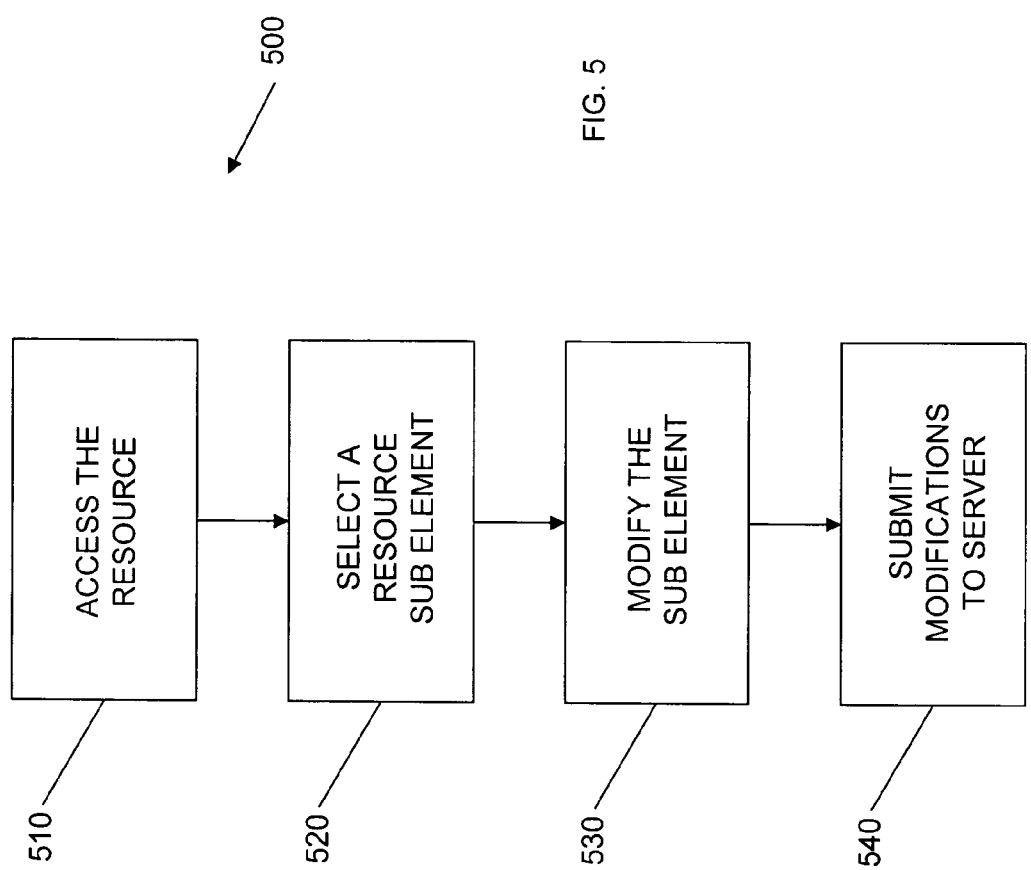
FIG. 5 is a flow chart of a method of modifying a resource sub element in accordance with the invention.

With reference to FIG. 5, a method 500 of modifying a sub element of a resource includes a step 510 in which a member accesses the resource. In a step 520 the member selects a sub element of the accessed resource for modification. The selected sub element is modified in a step 530 and submitted to the virtual community server in a step 540. The virtual community server may then serve the modified sub element to the community members by sending the modified resource content to the plug-in application or helper objects. The modified sub element may then be displayed.

For example, when the member chooses to make changes or add comments related to the selected sub element, a dialog or inline edit field may be prompted so that the member can enter the changes or comment text specific to the selected sub element. For example, if the member feels that a title of the article does not reflect the actual content of the article, the member can enter what the title should be. If the member feels that he does not agree with one of the paragraphs of the article, he can highlight and select the specific paragraph and then enter his changes. In other words, any actions can be applied to the selected sub elements in a similar way.

Once changes or comments have been entered, the browser plug-in application or helper object will communicate with the virtual community server which will associate the changes or comment with the selected sub element and may display the changes or comments directly in the browser window. This differs from the traditional forum, discussion or comment system where the posts, comments or forums have to be organized in a separate space or separate window. The system can display the changes and comments in multiple ways so that the changes and comments are easily distinguishable from the original content.

For example, the system can use different fonts, colors or popup text to represent the changes or comments within the existing resource. The system can also display the changes or comments in the margin of the existing resource with a line pointing to the location of the selected sub element, similar to Microsoft Word tracking changes. The system can also use a balloon helper mechanism including a marker at the position of the selected sub elements and displaying the comment when the member moves a pointing device such as a mouse over the position. The system can also display the changes or comments inline. The changes may be shown inside a transparent layer on top of the original content. How the added comments are displayed can be set up in the system and may be configurable by the member.

The system in accordance with the invention may display changes or comments from different members in different layers on top of existing contents so that members can distinguish and view modifications from different members. Different layers may be distinguished by different colors, fonts or other signs and may be opaque or transparent. Each layer may be expanded dynamically and multiple layers can be grouped, ungrouped, selected, deselected, shown, hidden, deleted or edited at the same time.

The system preferably has the ability to hide and show the changes or comments. In the case where a member does not want to see changes or comments inline with the original comments, the system will hide the comments dynamically so that the member has the option of not seeing the changes or comments. The system may allow members to enter a criterion or filter to communicate to the system which changes or comments to show. Thus, for example, the criterion may include showing all comments within last three days or, all comments that have been voted by others as being valuable.

The connection type and type of message communicated between the plug-in application or object helper and the centralized virtual community server are system and implementation dependent. The plug-in application or helper object may use UDP, TCP, HTTP or any other protocols to connect with the centralized virtual community server. The virtual community server can be any server such as a HTTP server, a normal TCP server or even a stateless UDP listener. The virtual community server may be a centralized server or may include more than one server such as a cluster of servers. The format of the message is also arbitrary as long as it carries the information regarding the change or comment such as who created it, when it was created, the change or comment text, and the sub element to which it applies.

Once the virtual community server receives the change or comment, the virtual community server will first store the change or comment in a repository of the centralized virtual community server such as a backend database or file system. In the meantime, as the virtual community server knows all the current members that are accessing the selected resource, the virtual community server will broadcast the change or comment to all current members in the system so that others who are accessing the selected resource (which are also current active members of the virtual community for that resource) are notified immediately and can receive the change or comment immediately in real time. In the case where the resource based virtual community allows members to be in the same community consisting of those members accessing multiple resources or groups of resources that are related, even though they are accessing a different resource, the system will view these members as if they are accessing the same resource. For these members, changes on one of the resources may be sent either to members that are only accessing that particular resource, or sent to all members visiting related resources. This is a system dependent decision.

There are many ways in which the virtual community server broadcasts the changes or comments to the members. The virtual community server may use either pull or push methods. For example, each client (browser plug-in application or helper object) can either periodically query for changes or comments, or the virtual community server can push the new message into each client's plug-in application or helper object by HTTP push. Alternatively, each client can have a daemon listening on a particular TCP or UDP port and the virtual community server may send the new message to the port. The system may also combine several changes or comments from other members and send them together in order to save bandwidth or improve performance.

The system in accordance with the invention provides for different members having various preferences. Some members may not like being disturbed or do not care about changes or comments from the system. In this case, the centralized virtual community server may setup a filter for different members. The filter can be based on any criteria, such as types of sub elements, change or comment date, author of the change or comment, type of change or comment, or anything else that can be used to distinguish the change or comment made by others. For example, one member can specify that he is only interested in changes or comments made to the title of an article and another member may only be interested in any comments related to pictures. The system will choose only those changes or comments passed through specific filters to send to the members having such customized filters.

After the browser plug-in application or helper object from another member receives the message containing the changes or comments from other members, the client system will display the changes or comments together with the original content. This procedure of combining different contents can be achieved by several means. One way is to dynamically insert the new content into the current working buffer or cache of the original document. Another way is to create new layers on top of existing contents and display new content on the new layers, similar to floating windows or balloon helpers. Yet another way is to integrate the new content into the existing contents. For instance, if the resource is a HTML resource, the new content can be wrapped into a new HTML element and dynamically inserted into the DOM tree of the existing HTML. Some actions in response to member's events such as a mouse-over event and click can also be added on the new contents by way of Dynamic HTML or script code. The plug-in application or helper object can also combine various combination methods.

When more and more changes or comments are added to the resource, members might be overwhelmed. To help members manage all the changes and not see all of them at once, in addition using the filters to filter the changes, the member's plug-in application or helper object may display a list of all changes and allow members to dynamically select one or portions of the changes or comments. The system will then combine the original contents with those selected changes or comments. The member will see how many total changes are available and only select those changes that he is interested in.

This is different from the filter method described above in that the filter does not show all the available changes.

In addition, to help a member quickly find the changes or comments he is interested in, the system may provide search capabilities. The search capability allows members to enter keywords and other criteria that the system will use to search for particular changes. The search can be integrated with the filters or the comment list. For example, the search result can include a subset list of changes and when a member selects one or more in the list of found changes, the system will display those changes accordingly. The search can be implemented in both the client and server side.

An updating process is similar to the process whereby a user subscribes to a channel of information from the Internet and only receives updates periodically from the servers, like RSS or others news broadcasting system. In the updating process, the virtual community server sends changes or comments so long as the member is still accessing the resource. The changes or comments will be presented and displayed together with the current content window. Once members leave the resource such as by browsing away from the resource they are viewing, the member no longer belongs to the virtual community associated with that resource, and the system may also stop displaying the changes and comments for that resource, unless it has been configured to continue viewing that resource.

In additional to being able to add changes or comments to the sub elements of the resource, members of the community associated with the resource can also add changes or comments to existing changes or comments. For example, a member may comment on whether he agrees with the changes or not, or the member may vote for some sub elements, or for changes or comments for those sub elements so others will know which ones are valuable changes or comments. The voting process can be achieved by utilizing existing voting mechanisms or services provided by the virtual community server. Basically, members who are accessing the resource can submit their votes to decide upon the ratings of those sub elements and changes.

A member of the virtual communities can also perform other activities on the sub elements selected such as chatting, playing games, asking questions, submitting related information and links. In addition, another feature allows members of the community associated with the resource to modify it in real-time so that others can see the modified resource or contents immediately. For example, web viewers can see the new, modified web page from within their web browsers.

Traditionally, web pages can only be modified by authors. This is primarily because web contents are served from the originating web server. Most originating web servers are read only through standard HTTP port 80 connected from browsers. To update a web page, the author must go online and use a different command or protocol such as ftp. These protocols are not accessible to the public since many of them require users to have an account to access the server. Some web pages allow users to post their changes or submit their feedback through HTML forms, but still, most still require that the web author perform the modification. Some web pages like wiki sites do allow people to modify the contents as they are visiting the page, but it requires special software installed in the web servers and the actual resource being accessed is changed by the web server software. Another technology used by greasemonkey injects custom javascript into selected web pages to change the web pages while they are being displayed. However, using that technology does not easily allow users to change the content on the fly and there is also no concept of community involved.

Thus, generally only the author of the resource has the privilege of making changes to the resource. With some extensions such as FrontPage extension, a CGI, HTTP post or put commands, the web server may allow users to update the web page content through standard HTTP protocol or within a web browser. Many of these modifications still require an account username or password. This is primarily because of security considerations. Allowing any user to change the web page contents arbitrarily, would enable a malicious user to damage the contents of the web page.

In accordance with the invention, any member can modify the original resource or web page so that others in the community can view the modified version in addition to the original resource or web page if they so choose. This is especially useful when the original resource or web page has not been actively maintained by the original author or the web pages contain errors or misleading information that one reader discovers and wants to share with others, or the original web page contains useless information such as advertising that readers are not interested in.

In accordance with another aspect of the invention, a member may select sub elements of the resource or web page, make changes thereto, and choose to keep the changes to himself.

In accordance with another aspect of the invention, in order to prevent a member from arbitrarily making changes to a resource, changes that are to be published to the community may be verified, voted upon, or otherwise rated. For example, the system may prompt other members of the community to vote on the validity of the changes and only changes rated highly will be allowed to propagate to all members in the community.

The modification process in accordance with the invention begins when a user 201 of a resource 203, who becomes a member of the virtual community based on that resource 203, accesses the resource 203 in a step 210 (FIG. 2). At this point, the community server 204 will return the community content such as the community home page in a step 211. Then the member 201 selects one or more sub elements of the resource through methods discussed above. Once the sub elements are selected, the system may prompt the user to choose to change or modify the original contents. The member 201 then modifies the selected sub element in a step 212 through the plug-in application or helper object 207. The modified sub element will be sent to the virtual community server 204 in a step 213. When another user 202 becomes a community member by accessing the same web resource 203 in a step 220, the community content 205 is returned to the user 202 in a step 221. The community server 204 also sends the modified content 206 from user 201 to user 202 in a step 222. The plug-in application or helper object renders the modified content 206 in a step 223.

Alternatively, the changes may not be displayed on the original resource immediately, but will be stored by the centralized virtual community server and later made available to the community members. However, if the resource includes support, such as that provide by wiki sites or server extensions and with authors' permission, the changes may also be stored to the original document, which is server independent. The system can then show a new menu, new button or new dialog to allow members to continue.

Once the member decides to modify the content, there are multiple ways for the member to modify the content of the selected sub elements. The simplest is for the member to replace the content with other content such as HTML texts for web page content. This can be achieved by putting the source code of the HTML page into a text editor with selected text elements highlighted. Then the member can modify the content inside the text editor and copy and paste the content from other programs or documents, and submit the changes to the system to process and publish.

Alternatively, dedicated authoring software like FrontPage, DreamWeaver or Netscape Composer may be launched to modify the resource directly and once finished, submit changes to the system. This approach has a small overhead in that the editing process is not made in place and also an additional software component may need to be installed.

With the development of WYSIWYG (What You See Is What You Get) graphics and word processing technology, a third way to modify the content of the selected sub elements includes editing the elements in place. In other words, the resource becomes a canvas on which users can move elements around, change element text by directly typing into the resource or web page. Basically, members are modifying the resource as if they are using a WYSIWYG editor like FrontPage or Netscape composer. Once finished, the modifications are placed directly inside the original viewing window of the resource to overlap with the original content.

Multiple ways can be used to start the editing in-place process. If the resource container or the web browser supports an editing mode, the plug-in application or helper object can simply enable the editing capability by calling specific APIs to enable editing of the selected resource, collection of the edits and submission of the edits to the system. If the resource container or browser does not support inline editing directly but supports some sort of scripting capability such as DHTML (dynamic HTML), the plug-in application can inject specific script or DHTML code into the resource inside the viewing window and the newly added script code will enable the member to drag and drop sub elements, show and hide elements, or change text and attributes inside those elements. Once finished, the script codes will keep track of the changes made and then submit them to the system.

Once the member finishes making modifications, the plug-in application or helper object will remember the changes made, and submit the changes to the virtual community server to save and publish the changes. The virtual community server will save the changes in a back-end repository and the changes can be re-extracted and re-applied over the original resource or web page by re-producing the modified changes at any time later for the benefit other members. The storing mechanism of the changes may be accomplished in a conventional manner. The transferring method of such modifications can utilize the same or different mechanisms as the transference of the changes or comments.

Once the virtual community system saves the modified contents, the virtual community system may decide how to publish the changes. The member may choose to make the modifications private or share the modifications with all members of the community. If the modifications are private, then only the member will see the modifications when he re-visits the resource. If the member wishes to share the modifications, then whenever other members visit the resource, the plug-in application or helper object will retrieve the changes and display the changed contents. However, if they are made public to everyone, the system may query the system configuration to determine if it is allowable. Such determination may be made depending upon whether most members in the system agree with the changes, or the changes have a very high rating, or the author of the resource authorizes the changes.

After one member has made changes and the changes have propagated to the virtual community server, other members have the option of viewing either the original resource or the modified version according to their own preferences. For example, other members may be notified that another member has modified the resource or web page and may be asked whether or not he or she wants to receive the changes. It is also possible for some members to disable this feature and be served only the original contents. If the member agrees to receive the changes, the plug-in application or helper object will then contact the virtual community server associated with the current resource and retrieve the saved modifications and then render the modifications on top of the existing resource or web page. Modified contents may be shown in different fonts, colors, and pop-up text or in transparent layers to distinguish the modified contents from the original contents.

When multiple changes are submitted to the virtual community server, the virtual community server may record all of the changes. Displaying all of the changes may only be possible at a future time, and may be impossible due to conflicting changes. For example, if two members modify two different parts of the original resource, then the plug-in application or helper object can apply both changes and display the mixed result. But if the modifications are on the same sub elements such as both relate to changes to the title, the system cannot display both changes. In this case, the system may choose to display the one with a higher popularity, or let members decide which one to use. This process may also be similar to the selection methods of comments outlined above the difference being that the display of the original resource may change if the user chooses to apply different modifications; as if the original author has changed the resource.

Of course, during the process of publishing modified content and receiving the modified content, security must be enforced so that no content from others is allowed to do anything harmful to the receiving party's browser, software, computer or networks. This is generally enforced by a browser sandbox, but the system may also limit some capabilities of script code to prevent malicious users in the community from spreading malicious content. Furthermore, all modifications made by community members must obey common laws and cannot claim the copyright or ownership of the original resource or web page contents according to the copyright laws.

When there are many modifications submitted by various members in the virtual community, the members may be prompted with too many modifications or comments from many different members in the community and some comments or modifications may be undesirable. In this case, the community may use a mechanism to allow community members to rate or vote on the quality of those members' contributions so that members can know immediately which change or comment is more meaningful and helpful and worth reading.

One of the mechanisms for community members to verify the value of others' changes or comments is to allow members to vote on the quality of such contributions. For example, members can click on a vote link associated with each new modification or comment and optionally provide feedback regarding their quality. The system may automatically rank the ratings and display the most highly ranked modification or comment on top and put the lowest ranked modification or comment at the end of the list that is presented to members. In some cases, the change or comment may be removed from the list. Another mechanism is discussed in co-owned and co-pending application Ser. No. 60/596,274, filed on Sep. 13, 2005 and entitled "System and Method for Online Community Members to Vote for Community Management Such as Clean Up Online Garbage", the disclosure of which is incorporated herein by reference.

The system and method in accordance with the invention works not only for web resources such as web page or web site, but also for other online resources that can be shared by multiple people. For example, an ftp user may find that one of the files in the ftp site is out of date and cannot be updated since he does not have permission. Using the system and method of the invention, the user can update the file and communicate the update to the virtual community server. When other members connect to the same ftp resource, the members may be notified that there is an updated version of the file. Also, if the resource is application software, a member can provide a new component for the software and upload the new component to the virtual community server. Other users may be notified that there is a new component for that software and decide whether to utilize the new software component. In summary, as long as the resource can be updated or modified by a user, he/she can use the system and method of the invention to propagate changes to other users as long as they are also using the same resource.

In accordance with another aspect of the invention, a method is operable to display information related to a resource. Such information includes statistical information including the number of community members currently accessing a resource, the number of comments associated with a sub element of the resource, the ranking of changes and comments, the number of reviews of resources, the number of hits of the resources, and the number of community members that have accessed a resource. Such statistical information may provide community members with indications as to the quality of, and interest in, various resources before the member accesses the resource. The statistical information may be related to each sub element in a resource.

Figure 6:
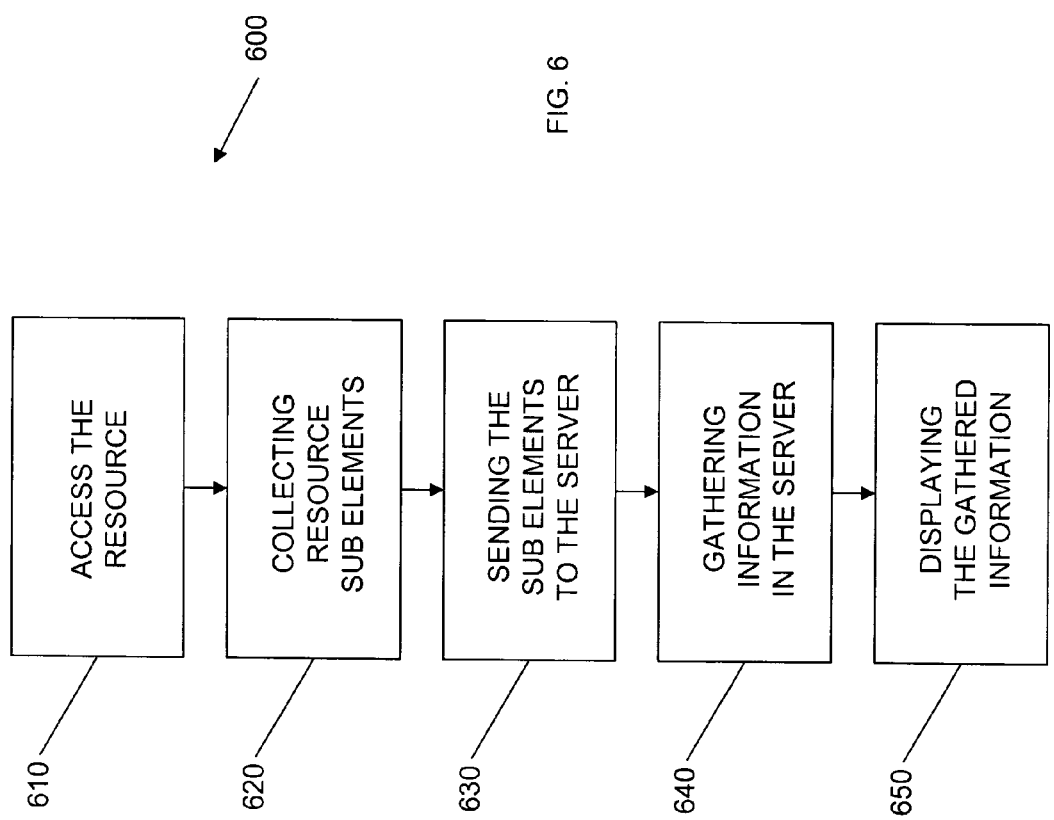
FIG. 6 is a flow chart of a method of gathering and displaying information related to a sub element in accordance with the invention.

In accordance with the invention, when the virtual community server sends the community content to a member, it may also send information such as how many people are accessing the sub elements of the resource including all links to other resources. This information may be an indication of the popularity the sub element. URL links are one special type of sub element in the web resource context as they are hyper links linked to other resources. Statistical information about URL links are special because they are really statistical information about virtual community based on another resource which the link is pointing to. Displaying the information before the user navigates to that resource can help the user navigate the web With reference to FIG. 6, a method generally designated 600 includes a step 610 in which a user accesses a resource. The plug-in application or helper objects collects sub elements of the resource in a step 620 and send the collected sub elements to the virtual community server in a step 630. In a step 640 the virtual community server gathers information related to each sub element and the gathered information is rendered and displayed by the plug-in application or helper object in a step 650. The information may be updated periodically.

Figure 3:
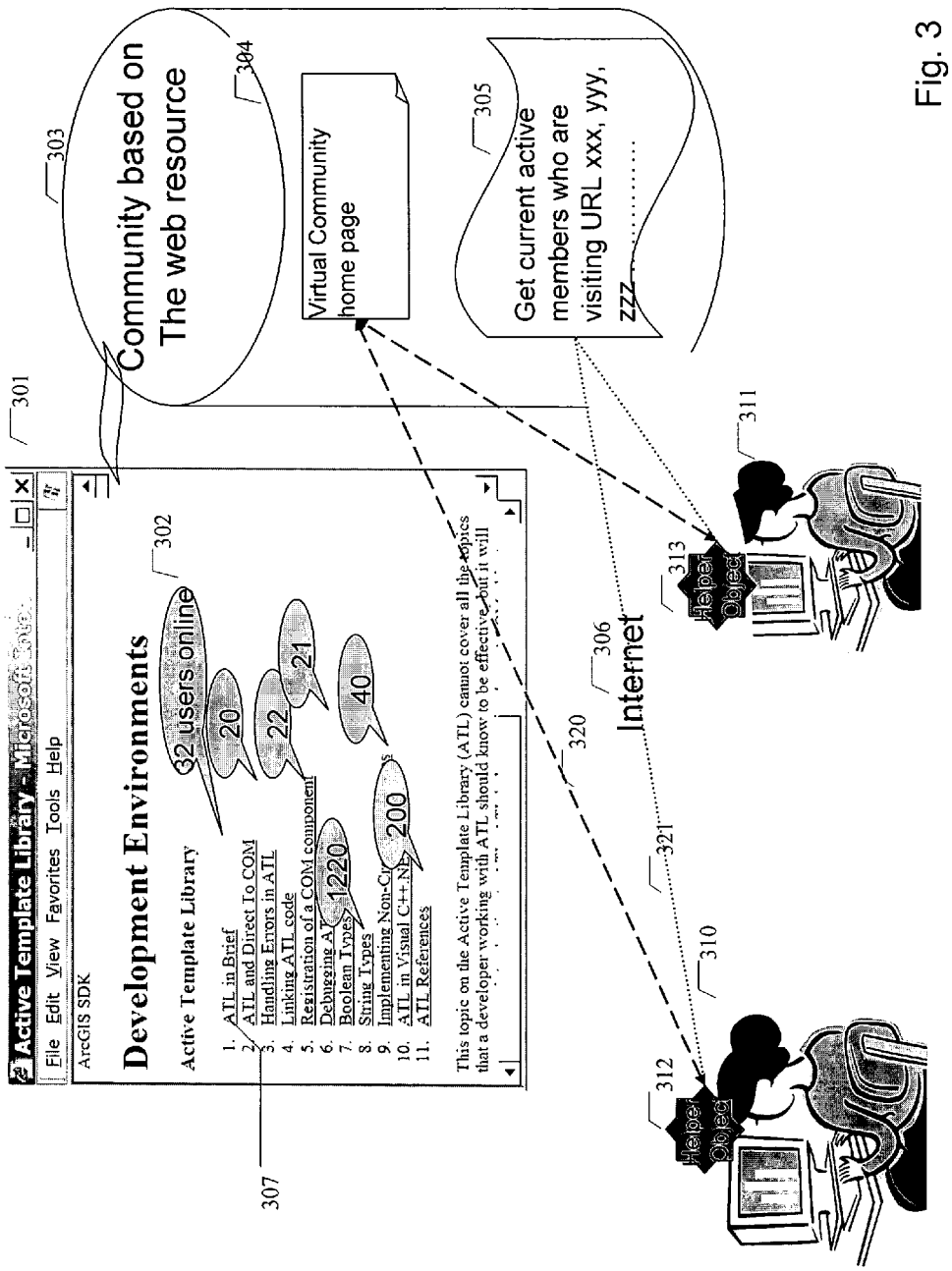
FIG. 3 is a graphical illustration displaying information related to sub elements of the resource in accordance with the invention.

In the resource-based community in accordance with the invention, the current active community members 310 and 311 are those that are currently accessing the resource 301 as shown in FIG. 3. Before the members 301 and 311 visit a new resource 307 such as a web page, a web site or items linked from current resource 301, if they are presented with useful statistical information 302 regarding the linked resource 307 including the number of current active members who are also visiting that resource, the members 310 and 311 may then decide whether they are willing to visit that linked resource 307.

In order to display information relating to a link to a URL in the current resource 301 or web page, the browser plug-in application or the helper object 312, 313 may collect all of the URLs inside the current web page 301 from the main browsing window and send a URL list to the virtual community server 303. The virtual community server 303 may then return the information related 305 to each link 307. This process can be run at a backend in a low priority process utilizing the members' idle computer and network time to avoid increasing a total response time. Another approach to save the plug-in application from parsing to get the URL list is to enable the virtual community server to get a list of URLs directly from the original web servers of that resource and then retrieve and parse the content. That may only work for static web pages and not dynamic web pages which may changes on different clients' browsers.

Once the virtual community server responds with the information for each URL, the browser plug-in application or helper object may go over the current rendered web page that is being viewed by the current member and associate each URL with the information number and present the information to the member when needed. For example, the member may click a button in the browser to display the information. Alternatively, the system may provide a popup or floating textbox showing the information when the member moves the mouse over a linked URL.

In this manner, a current resource user may compare the information related to each link to determine which link has more active users. This may save the current resource user time in searching for information of interest. In general, a large number of users accessing a resource or web page, indicates a better or more interesting resource or web page. Furthermore, a large number of users accessing a resource or web page provides a member a greater chance of collaborating with other community members in real time.

Information may also be provided for sub elements including bookmarks, tags, favorite's lists, desktop items and other shortcuts to other documents. Additionally, information may also be provided for community contributed actions related to sub elements. The browser plug-in application or helper object may retrieve from the virtual community server meta data related to actions taken on selected sub elements such as how many members are accessing the actions taken or the ranking of the actions taken.

When the resource being accessed by a member includes search results, information related to the links returned may be advantageously used by the member in making a decision regarding which link to navigate to.

In accordance with an aspect of the invention, users may decide whether or not they want to receive or view the information. Users may easily configure options to enable or disable this feature. Once disabled, the browser plug-in or helper object will not collect resource sub elements in step 620.

Advertisements can be displayed together with community content. For example, some paid advertisements, which are used to sponsor the communities, may be displayed within the comments or modified contents as long as it does not interfere with member's capability of browsing. Preferred advertisers may be served more frequently and be displayed in better positions within the community content. Preferred advertisements may be placed at the top of lists of links or in the main body of the browsing window as long as it does not disturb the member's experience of accessing resources. In addition, advertisers can also bid for advertisement placement and occurrence of the advertisements through various means.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and their equivalents.

What is claimed is:

1. A method of modifying a resource in a resource based virtual community by a web resource user comprising the steps of:
    a web resource user accessing any web resource and becoming a member of the resource based virtual community wherein at least one web resource user who is accessing and using said web resource automatically becomes the virtual community member;
    said web resource user selecting any original sub element of the accessed web resource for modification by a client side browser component;
    recording positions of selected sub elements;
    making modifications to the selected sub element of web resource inside the client side browser by said client side browser component without accessing the source code of original server source files of the web resource; further comprise steps selected from among:
        said web resource user entering replacements for said selected sub elements;
        said client side browser component launched an external editor for said web resource user to modify;
        said web resource user modify the content of said selected sub elements in place; and then
    submitting the modifications to a virtual community server for processing thereby wherein said web resource remains unchanged to users not part of the virtual community;
    displaying the modified sub elements by said client side browser component to render the changes on top of the original web resource.

2. The method of claim 1, wherein displaying the modified sub element comprises displaying a pop up window within the accessed resource.

3. The method of claim 1, wherein displaying the modified sub element comprises applying the modified sub element to the accessed resource and displaying a modified accessed resource.

4. The method of claim 1, wherein displaying the modified sub element comprises displaying a dialog box in the accessed resource.

5. The method of claim 1, wherein displaying the modified sub element comprises displaying an overlay over the accessed resource, the overlay including the modified sub element.

6. The method of claim 1, wherein displaying the modified sub element comprises highlighting the modified sub element using a text attribute.

7. The method of claim 1, wherein in place editing comprise turning said resource into a canvas on which user can move elements around or change element text by directly typing.

8. The method of claim 1, wherein without using the original server files further comprising without editing or recompiling the original server files.

9. A method of displaying a modified sub elements of any accessed web resource in a resource based virtual community by a web resource user comprising the steps of:
    accessing a virtual community server, the virtual community server creating the resource based virtual community based on the accessed resource, wherein at least one web resource user who is using and accessing said web resource automatically becomes virtual community member;
    receiving the modified sub element of the resource and position of said sub element by a client side browser component in the virtual community server the sub elements being modified by members of the resource based virtual community without accessing the source code of original server source files of the web resource;
    applying the modified sub element to the web resource; further comprise steps selected from among:
        said web resource user entering replacements for said selected sub elements;
        said client side browser component launched an external editor for said web resource user to modify;
        said web resource user modify the content of said selected sub elements in place; and then
    displaying the modified resource to members of the resource based virtual community wherein said web resource remains unchanged to users not part of the virtual community by said client side component to render the changes on top of the original web resource.

10. The method of claim 9, wherein applying the modified sub element to the resource and displaying the modified resource comprises displaying a pop up window with the modified sub element.

11. The method of claim 9, wherein applying the modified sub element to the resource and displaying the modified resource comprises displaying an overlay over the modified resource, the overlay including the modified sub element.

12. The method of claim 9, wherein applying the modified sub element to the resource and displaying the modified resource comprises highlighting the modified sub element using a text attribute.

13. The method of claim 9, wherein displaying the modified sub element comprises filtering the modified sub element.

14. The method of claim 9, wherein the modified sub element is received in the virtual community server from a client plug-in application, the client plug-in application being operable to modify the sub element.

15. The method of claim 14, wherein the client plug-in application is operable to apply the modified sub element to the resource.

16. The method of claim 14, wherein the client plug-in application further comprises a filter, the filter operable to allowing a user to filter the displayed modified content.

17. The method of claim 9, wherein the resource comprises a web page and the sub element comprises a web page title.

18. The method of claim 9, wherein the modified sub element comprises a sub element edited in line.

19. The method of claim 9, further comprising serving the modified sub element, the modified sub element being served by the virtual community server.

20. A method of adding comments to sub elements of a web resource comprising the steps of:
    a web resource user accessing any web resource and becoming a member of the resource based virtual community wherein at least one web resource user who is accessing and using said web resource automatically becomes the virtual community member;

said web resource user selecting any original sub element of the accessed web resource for modification by a client side browser component;
recording positions of selected sub elements;
adding comment to the selected sub element of web resource inside the client side browser by said client side browser component without accessing the source code of original server source files of the web resource; further comprise steps selected from among:
said web resource user entering replacements for said selected sub elements;
said client side browser component launched an external editor for said web resource user to modify;
said web resource user modify the content of said selected sub elements in place; and then
submitting the added comment to a virtual community server for processing thereby wherein said web resource remains unchanged to users not part of the virtual community;
displaying the modified sub elements by said client side browser component to render the changes on top of the original web resource.

* * * * *